United States Patent

[11] 3,613,818

| [72] | Inventors | George Schubert<br>Aurora;<br>Lloyd D. Swayze, Yorkville; John B.<br>Waggoner, Joliet, all of Ill. |
|---|---|---|
| [21] | Appl. No. | 855,343 |
| [22] | Filed | Sept. 4, 1969 |
| [45] | Patented | Oct. 19, 1971 |
| [73] | Assignee | Caterpillar Tractor Co.<br>Peoria, Ill. |

[54] EMERGENCY SUPPLY SYSTEM FOR VEHICLE HYDRAULIC COMPONENTS
7 Claims, 4 Drawing Figs.

[52] U.S. Cl. ............................................. 180/79.2 R, 60/52 S
[51] Int. Cl. ............................................. B62d 5/06
[50] Field of Search ............................................. 180/79.2 R, 79.2 B; 60/52 S, 52 EH

[56] References Cited
UNITED STATES PATENTS

| 2,440,371 | 4/1948 | Holley | 60/52 S UX |
| 2,898,737 | 8/1959 | Rockwell | 180/79.2 UX |
| 3,154,921 | 11/1964 | Junck et al. | 60/52 S |
| 3,407,894 | 10/1968 | Thompson et al. | 60/52 S X |
| 3,424,262 | 1/1969 | Kunz | 180/79.2 |

*Primary Examiner*—Benjamin Hersh
*Assistant Examiner*—John A. Pekar
*Attorney*—Fryer, Tjensvold, Feix, Phillips & Lempio ABSTRACT: An emergency supply of fluid under pressure to the hydraulic system of a vehicle with a normal supply derived from a primary source of pressure such as an engine-driven pump. Pressure for the emergency system is derived from a secondary source or wheel-driven pump to insure a supply upon engine failure and whenever the vehicle is in motion. Flow from the emergency system supplements or replaces that in the normal system whenever the normal system flow falls below a predetermined value. Automatic valves also prevent flow from either system toward an idle pump or rupture in the other system.

INVENTORS
GEORGE E. SCHUBERT
LLOYD D. SWAYZE
JOHN B. WAGGONER

BY

ATTORNEYS

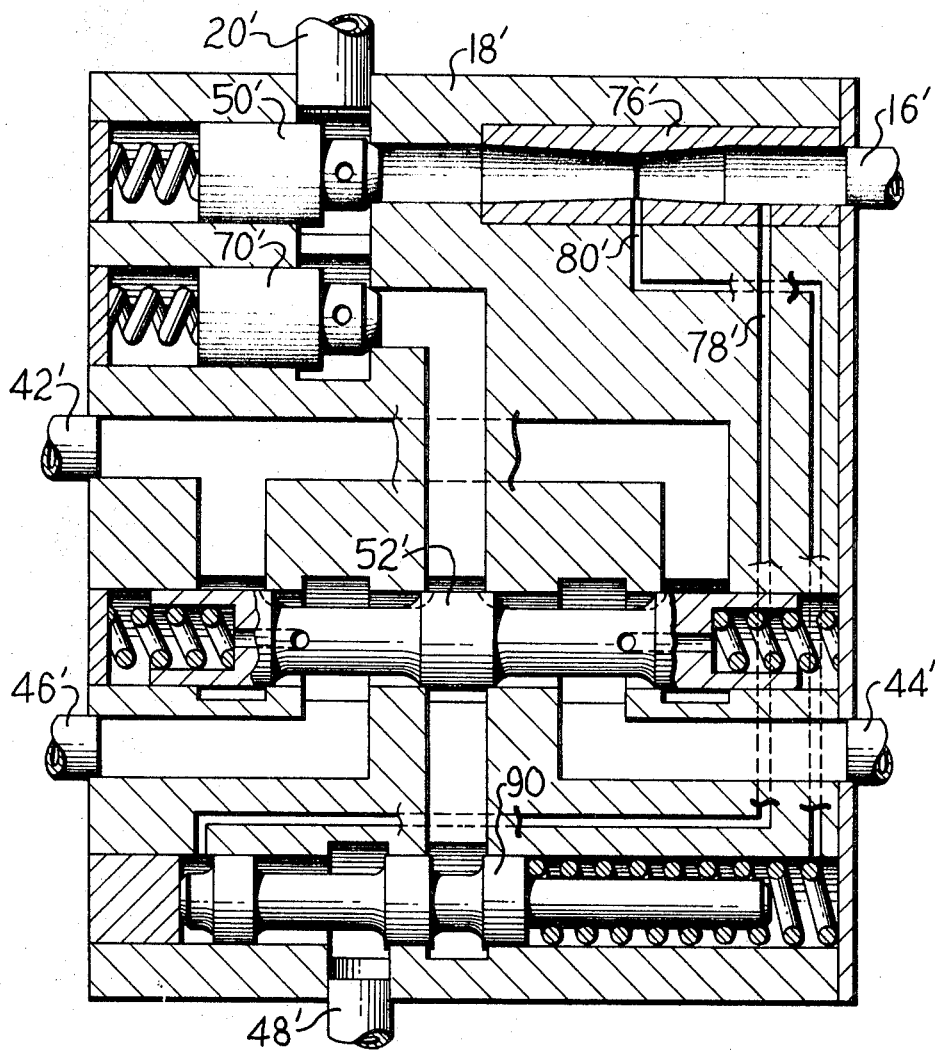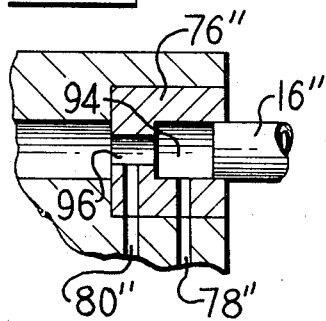

EMERGENCY SUPPLY SYSTEM FOR VEHICLE HYDRAULIC COMPONENTS

Generally speaking, the system is capable of use with any hydraulic component of a vehicle, depending upon pressurized fluid and is probably most valuable in connection with braking or steering where loss of hydraulic flow might cause disaster. The system will be disclosed herein in connection with steering for purposes of illustration.

In large vehicles, it is impractical to carry sufficient fluid under pressure to serve for emergency purposes for braking or steering for any extended period of time or even to supplement steering pressure when the vehicle engine is operating at low-idle speed. The present invention provides an emergency steering system wherein a flow-sensitive means will initiate flow from an auxiliary system to combine with the normal flow during adverse conditions. More particularly, a flow control and sensing unit will effect actuation of the valve that will convert flow from an emergency pump into the steering system whenever steering from the normal steering pump falls below a predetermined value. By this system, emergency flow is communicated to the steering system during low-idle operation of the engine or under conditions where the engine steering pump system fails entirely such as when the engine stops or a primary pump suction line is ruptured. The emergency steering pump is wheel driven and reversible so that whenever the vehicle is in motion, the pump will develop flow to supplement or replace the normal steering system flow. The terms "wheel driven" and "ground driven" as used herein are interchangeable and intended to include a pump driven by any part connected with and rotating with an earth-engaging wheel of the vehicle. A more complete understanding of the invention and the means by which is is carried into practice will be obtained from the following Specification wherein reference is made to the accompanying drawings.

In the drawings

Figure 1:
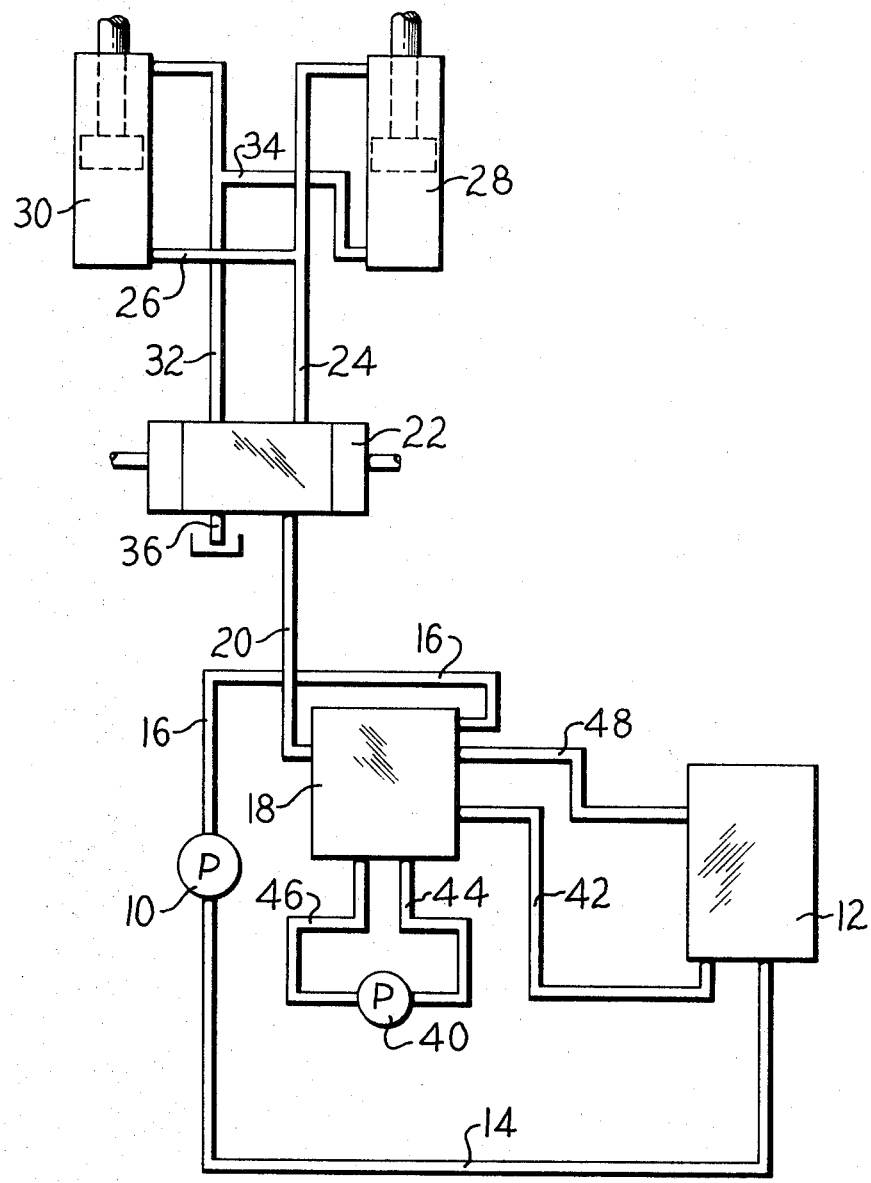
FIG. 1 is a schematic view of a hydraulically actuated steering system of a tractor of the like embodying the present invention.
Figure 2:
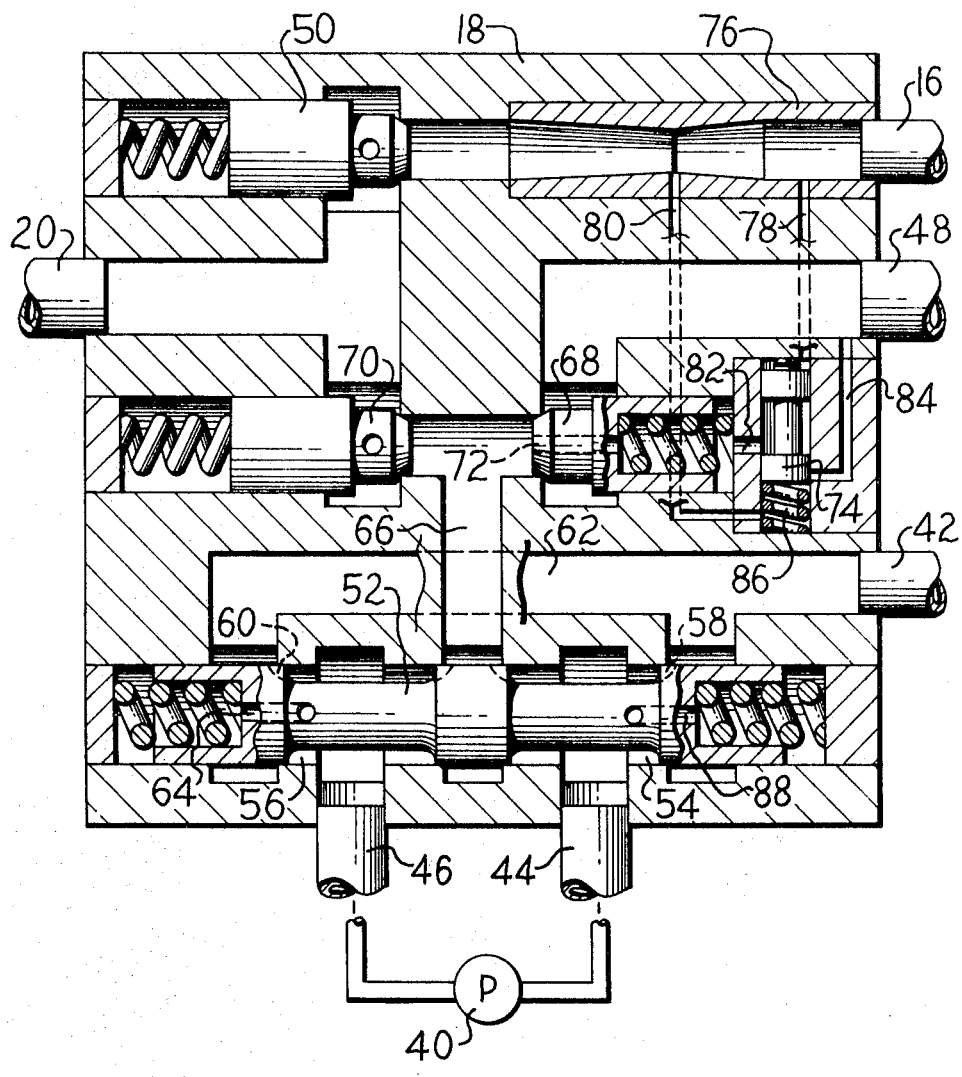
FIG. 2 is a schematic view of a flow control and sensing unit which forms a part of the system illustrated in FIG. 1.

FIG. 3 is a view like FIG. 2 of a modified form of flow control and sensing unit; and FIG. 4 is a fragmentary view in detail of a modification of a flow-sensing device shown in FIGS. 2 and 3. Referring first to FIG. 1, an engine-driven pump of a vehicle steering system is illustrated at 10 as arranged to withdraw hydraulic fluid from a tank 12 through a line 14 and to direct it through a line 16, a flow control and sensing unit 18 and a line 20 to a steering valve 22. The steering valve is of a conventional type which may be adjusted upon rotation of a steering wheel through mechanical linkage such as that disclosed in our Assignee's U.S. Pat. No. 3,260,325, or through hydraulic pilot operation thereof. It will suffice for an understanding of the present invention that it serves to direct fluid through lines 24 and 26 to the rod and head ends respectively of steering jacks 28 and 30. When adjusted in the opposite direction, pressure is directed trough lines 32 and 34 to the opposite ends of the same jacks, line 32 serving as a return line in one case, and the line 24 in the other case, venting fluid through a line 36 to the tank. A pump 40, which is wheel driven, is arranged to withdraw fluid from the tank 12 through a line 42, the flow control and sensing unit 18, and a line 44. Normally, this fluid is returned through line 46, the unit 18 and a line 48. Flow through pump 40 and the lies 44 and 46 is reversed when the direction of travel of the machine is changed. However, upon reduction of flow in the system normally served by the pump 10, which is indicative of a reduction of engine speed, the control and sensing unit 18 will divert flow from the ground driven pump 40 into the system, which supplements primary flow for steering. This improves steering response when a vehicle is traveling at a high ground speed while engine speed is low, such as when the machine is coasting down a hill.

The manner in which the foregoing is accomplished will be described first in conjunction with FIG. 2 wherein flow from the engine pump enters the housing of the unit 18 through the line 16 and overcoming the spring force of a check valve 50, flows outwardly through line 20 and to the steering system, as described in connection with FIG. 1. In the event that the valve 22 of FIG. 1 has not been adjusted to steer in either direction, the flow will be returned to tank through the line 36.

Meanwhile, the flow from the wheel-driven pump 40, as previously described, is drawn into the housing 18 through line 42 and is returned to tank by way of line 48, as will presently be described. A pressure-actuated shuttle valve, which includes a spool 52, is disposed to permit fluid to enter chambers 54 and 56 through slots 58 and 60 in lands of the spool, both communicating with a common passage 62. With rotation of the pump in a direction to withdraw fluid from a tank through line 44 and return it through line 46, pressure in chamber 56 will exceed that in chamber 54 and will communicate fluid under pressure through a passage 64 to the spring chamber at the left end of spool 52. This urges valve spool 52 toward the right, uncovering a centrally disposed normally closed passage 66 and admitting fluid from pressure line 46 thereto for direction, either back to tank through a check valve 68, or to combine with or replace flow from engine pump 10 to line 20 by way of a check valve 70.

Check valve 68, of the load check type, has a passage 72 communicating with a spring chamber and admitting fluid thereto capable of preventing it from being opened. The fluid can be vented from the spring chamber to permit the valve to open and permit return to tank through line 48. A small spool valve 74 controls fluid in the spring chamber of valve 68 in response to flow through inlet line 16 from the engine-driven pump. Just inside the housing is a fitting 76 which is tapered somewhat in the manner of a venturi tube and pressure is sensed through a passage 78 communicating with the upstream larger portion of the fitting and through a passage 80 communicating with the smaller portion disposed downstream thereof. Consequently, under normal flow conditions, the greater pressure will be sensed trough passage 78 and the lesser through passage 80. As flow is reduced, the pressures in the pssages tend to become equal. Under normal conditions, the high pressure in passage 78 will urge spool 74 downwardly, connecting the spring chamber of valve 68, through passages 82 and 84, with exhaust line 48 so the ground-driven pump 40 is ineffectual. Upon reduction of flow in line 16, pressure in passage 78 is reduced. Pressure in passage 80 combines with the force of a spring 86 to move spool 74 upwardly to the position shown, blocking loss of pressure from the spring chamber of valve 68 so that flow pump 40 will open check valve 70 and supplement or replace flow from the engine-driven pump, as the case may be, this flow being parallel to flow from the first source.

The wheel-driven pump 40 is of a reversible type so when the vehicle is traveling in reverse, the fluid from tank 12 will be withdrawn through line 42 and line 46 and returned by way of line 44. In this case, the fluid will pass through passage 62 of FIG. 2, thence through area 56 and will be directed to area 54 under pressure. Consequently, the pressure will enter the spring chamber at the right end of the spool 52 through a passage 88, moving the spool to the left to communicate the flow with passage 66. Pressure in passage 66 will, as previously described, either open valve 68 to return fluid to the tank or valve 70, which will cause the fluid to supplement the flow from the engine pump.

FIG. 3 shows a modification of the flow control and sensing unit wherein a hosing 18' is illustrated as adapted to receive flow from the engine-driven pump through a line 16' into a sensing element 76' which has passages 78' and 80' communicating with opposite ends of a spool 90. spool 90 is spring biased to the left, blocking flow to the tank through a line 48', but during normal operation with full flow in line 16', the greater pressure in line 78' urges the spool 90 toward the right to communicate flow from the wheel-driven pump to the tank.

Flow from the wheel-driven pump enters through line 44' or line 46', depending upon the direction of vehicle travel, and influences spool 52' in the same manner as spool 52 of FIG. 2. Thus, when spool 90 prevents return to tank because of relatively low pressure in passage 78', flow from the wheel-driven pump opens valve 70' and supplements or replaces the flow through line 16' which is directed through line 20' to the steering valve.

Because of the location of the valves 50' and 70', as well as the valves 50 and 70 of FIG. 2, the combined flows must be parallel and fluid from neither source can flow toward the other.

A modified form of the venturi shown at 76 and 76' in FIGS. 2 and 3, respectively, is illustrated in FIG. 4. In this figure, a fitting 76" is shown as having a large bore 94 and an adjacent small bore 96 communicating therewith.

Passages 78" and 80" communicate with these bores and serve in the manner of passages 78 and 80 in FIG. 2.

We claim:

1. An emergency fluid supply system for a hydraulic circuit having a primary and a secondary source of fluid under pressure comprising means to permit flow from said secondary source into said primary system in parallel and confluently with the flow therein, normally closed valve means preventing such flow, and means responsive to the flow rate from said primary source falling below a predetermined value to automatically permit opening of said vale means, whereby said secondary source supplies supplementary fluid to said hydraulic circuit when said flow rate in said primary system drops below sad predetermined value.

2. The system of claim 1 with means for sensing said flow rate from said primary source including a main fluid passage means having a normal diameter and a smaller diameter, and pressure sensing passage means intersecting and communicating with said main passage means at both diameters, said flow rate sensing means signalling said means to permit opening of said valve means.

3. The system of claim 1 for vehicle use in which power for said primary source of fluid under pressure is derived from the vehicle engine, and a separate source of power is used for said secondary source of fluid under pressure.

4. The system of claim 3 in which said separate source of power is derived from the relative movement of the vehicle with respect to the surface upon which said vehicle travels.

5. The system of claim 4 in which said separate source includes a pump means which is operable in either of two directions in dependence upon the operation of said vehicle in either of forward or reverse directions.

6. The system of claim 1 in which further passage means are provided for fluid from said primary and secondary sources to combine in a common flow, and check valve means to prevent fluid from either said source from flowing toward the other source.

7. In an emergency hydraulic fluid supply system for a vehicle steering mechanism which has an engine-driven pump normally providing fluid under pressure, the improvement comprising; a reversible emergency pump which is operable only when said vehicle is in motion, and means for permitting said reversible pump to supply supplemental fluid in response to a decrease in the flow rate from said engine-driven pump to said steering mechanism.

Disclaimer 3,613,818.—*George E. Schubert*, Aurora; *Lloyd D. Swayze*, Yorkville; and *John B. Waggoner*, Joliet, Ill. EMERGENCY SUPPLY SYSTEM FOR VEHICLE HYDRAULIC COMPONENTS. Patent dated Oct. 19, 1971. Disclaimer filed Jan. 16, 1984, by the assignee, *Caterpillar Tractor Co.*

Hereby enters this disclaimer to claims 1, 2, 3, and 4 of said patent.
[*Official Gazette March 20, 1984.*]